Nov. 30, 1965 L. G. EHMANN 3,220,074

SELF-SWAGING FERRULE

Filed Sept. 3, 1963

INVENTOR.
LESLIE G. EHMANN
BY
*[signature]*
Attorney

United States Patent Office 3,220,074
Patented Nov. 30, 1965

3,220,074
SELF-SWAGING FERRULE
Leslie G. Ehmann, Portland, Oreg., assignor to Esco Corporation, Portland, Oreg., a corporation of Oregon
Filed Sept. 3, 1963, Ser. No. 306,169
7 Claims. (Cl. 24—122.6)

This invention relates to a ferrule for a rope.

Such ferrules have heretofore been of two general types. One type has utilized a purely frictional mechanical clamping action wherein a cable is clamped by taped wedge blocks in a conical bore in a sleeve. With the types of wedge blocks heretofore used, this type of clamping action cannot be relied upon to develop the full strength of the cable because both the wedge blocks and the sleeve being relatively rigid and unyielding do not come into intimate gripping relationship with all of the strands of the cable and the individual wires in each strand which are also relatively hard and unyielding. The clamping pressure tends to be concentrated more at certain points than others, causing some of the wires to be damaged and weakened. Thus, allowance has to be made by way of a safety factor for a safe maximum loading somewhat less than the ultimate strength of the rest of the cable.

A more successful type of ferrule is the swaged ferrule which is formed initially either with a smooth cylindrical bore having a slip fit over the outside of the cable or having a bore with spiral ridges and grooves conforming to the lay of the strands. The material of such a ferrule is brought into intimate contact with the strands and wires of the cable by compressing or swaging the ferrule from the outside, causing the metal of the ferrule to fill the voids and crevices between the strands and wires to obtain intimate engagement and fit between the ferrule and the cable throughout sufficient length to surely anchor all the strands and wires without damaging them. This type of ferrule connection will develop the full strength of the rope but requires a powerful and cumbersome swage press to apply the ferrule. This makes it convenient to apply even small ferrules in the field and utterly impractical in the case of large ferrules required for the large cables used on modern equipment.

The general object of the invention is, therefore, to provide an improved ferrule for a rope. Other objects are to provide a ferrule which can be attached to a rope without special tools, to provide a swaged type ferrule which has a self-swaging action whereby a swaging press is not necessary to attach the ferrule to the rope, to provide a ferrule which combines the advantages of both a wedge type clamping device and a swaged ferrule, to provide a ferrule which is especially suited for very large ropes, to provide a ferrule having improved wedging core members, and to provide a ferrule having core members which are self-swaging by merely tensioning the rope.

A plurality of helical wedging core members are fitted into a conical bore in a sleeve of the present ferrule. These core members are inserted between the strands of the rope so that one strand lies on the outside and one on the inside of each core member. The core members are preferably grooved to fit the strands and are made of a softer material than the sleeve and rope. When the rope is tensioned, a self-swaging action takes place causing the wires of the strands to become embedded in the core members without the use of a swaging tool.

The foregoing and other objects and advantages will become apparent and the invention will be better understood from the following description of a preferred embodiment illustrated on the accompanying drawing. Various changes may be made, however, in details of construction and arrangement of parts and certain features may be used without others. All such modifications within the scope of the appended claims are included in the invention.

Figure 1:
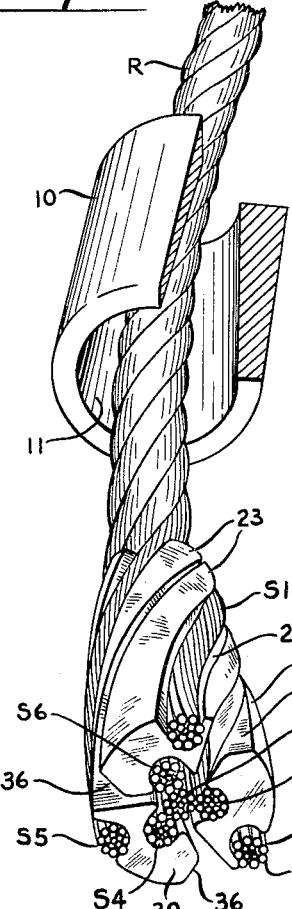
FIGURE 1 is a perspective view showing the manner of applying the ferrule of the invention to a rope, a portion of the ferrule sleeve being broken away.
Figure 2:
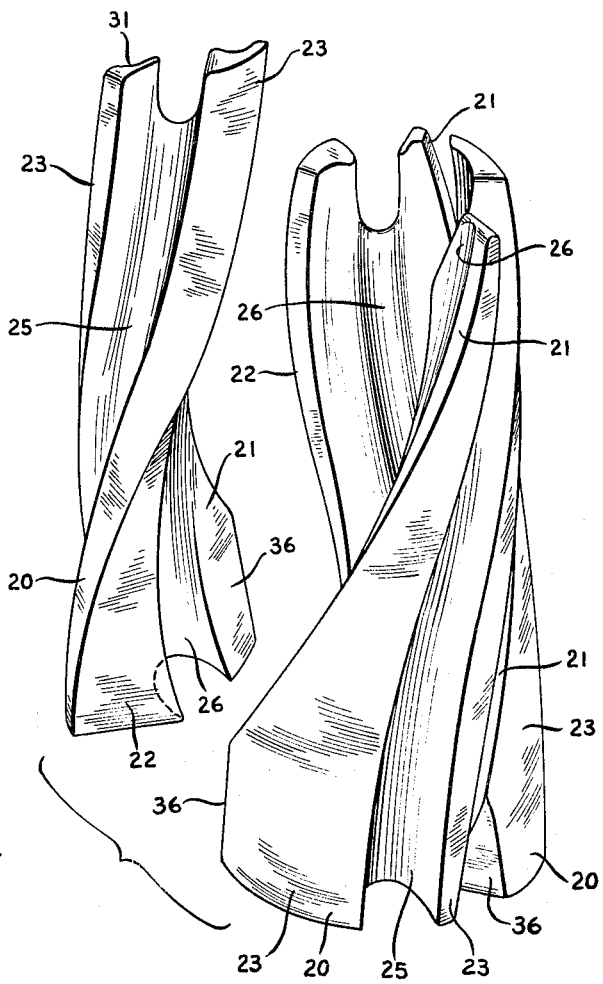
FIGURE 2 is a perspective view of the core members employed in the present ferrule.

The sleeve 10 has a tapered bore defined by a smooth conical interior wall 11. The sleeve is preferably made of a relatively hard and strong material such as steel, and of sufficient wall thickness that it will not yield or distort appreciably under working tension. The sleeve may be made integral with a clevis or other device for connection with an anchor point, mechanism or other cable, if desired.

The rope R in the present illustration is of conventional construction having six strands S1 to S6 twisted about a central strand S7. Each strand is composed of a considerable number of wires W. The invention is not limited to this type of rope or cable, however.

Three helical core members 20 are employed to secure the rope in the ferrule. The core members have approximately radial helical side faces 21 and 22 which fit together and outer curved surfaces 23 of a conical shape to fit the bore 11. Each outer surface 23 contains a longitudinal helical groove 25 spaced between the side faces 21 and 22. The pitch of the helix conforms to the configuration of the strands of the rope when they are separated sufficiently to receive the core members as shown in FIGURE 1.

When the three core members are assembled and fitted together, there is a spiral three-lobed central space between them formed in the main by a longitudinal interior helical groove 26 in each member. This groove intersects the two side faces 21 and 22. The groove has its major portion in side face 22 making this a narrow face, and only a minor portion in side face 21 making this a wide face, in radial directions. Thus, each groove 26 confronts a wide face 21 of an adjacent core member.

Because of the taper of bore surface 11 and the corresponding taper of the outer surface 23 of the core members, each core member has a relatively thick large end 30 and a relatively thin small end 31, the latter presenting a bifurcated appearance because of the breakthrough of each outer groove 25 into an inner groove 26 a short distance from the small end of the core member. This facilitates inserting the core members into the cable.

As shown in FIGURE 1, the end of a seven strand rope is inserted through the small end of bore 11 and projected out through the large end of bore. Then certain of the strands are slightly separated and the core members are inserted between the strands so as to place alternate strands in the outer grooves 25 an intervening strands in the inner grooves 26. This requires only a relatively small deflection of the separated strands from their original positions in the rope whereby any severe bending strains are avoided.

Figure 3:
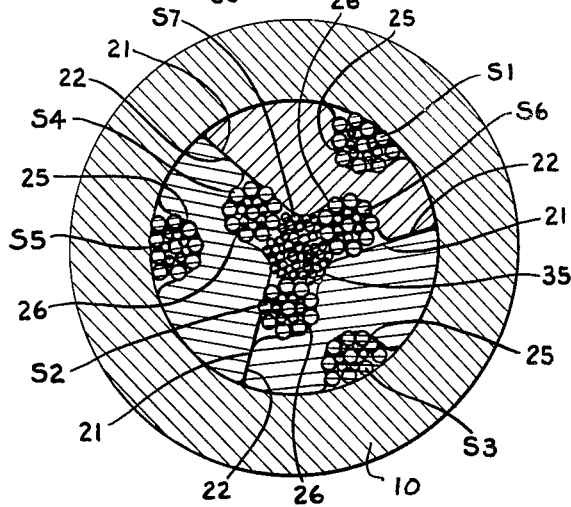
FIGURE 3 is a cross sectional view showing the ferrule on a rope.

Thus, as the strands are designated in FIGURES 1 and 3, the alternate outer strands S1, S3 and S5 occupy the outer grooves of the three core members while the intervening strands S2, S4 and S6 occupy the inner grooves 26. Center strand S7 remains in its central position in contact with the strands S2, S4 and S6, the latter three strands remaining in their original positions in the rope as seen in FIGURE 1. Both outer and inner grooves 25 and 26 are spiralled in a helical curve which fits the natural positions of the strands when they are slightly separated in the manner described. Since the strands S1, S3 and S5 are now at a greater distance from the center of the rope, the natural lay or twist of these strands in separated condition will have a somewhat greater pitch than the pitch of the strands in the unseparated part of the rope. Grooves 25 follow this curve.

Side faces 21 and 22 are spiralled in similar helical curves so that the outer grooves 25 will not intersect the side faces. Thus, all parts of the core members are of helical configuration generally following the lay of the outer strands S1, S3 and S5 in slightly separated condition.

When the core members have been inserted in the rope in the manner described, the rope with the core members is pulled into the core 11 and the core members may be driven in to make a snug fit. When the rope is tensioned sufficiently, the rope itself effects swaging of the relatively softer core members so that substantially all the voids are filled and the metal of the core members flows to some extent to partially envelope the individual wires of the strands, as shown in FIGURE 3. Because of the twist of the wires in each strand, all the wires are engaged and embedded in the groove surfaces which partially envelop the strands. Also, an inner portion 35 of each core member bears against and partially envelops wires of the center strand S7 in addition to the clamping action exerted upon this strand by the three contiguous strands S2, S4 and S6. The strands S2, S4 and S6 are clamped between adjacent core members and also against center strand S7.

The core members are preferably slightly longer than the sleeves so that they may protrude slightly from both ends of the sleeve and insure utilization of the full length of the sleeve. In such case there may be no necessity for the side faces 21, 22 to fit together outside the large end of the bore and the large ends of the side faces 21 may be bevelled off at 36 for convenience in manufacture.

The present ferrule provides a superior mechanical clamp even without any swaging action but it is preferred to make the core members of a material which is softer than the sleeve and the wires of the rope whereby the grip on the rope is enhanced without damaging and weakening any of the wires. When the sleeve and wires are made of steel, a suitable self-swaging material for the core members is an aluminum alloy.

The invention is, of course, not limited to a seven strand rope nor is it limited to a rope having an odd number of strands. In any case there will be a core member for each pair of strands in the rope and the existence or absence of an additional strand in the center of the ferrule does not affect the gripping action of the core members on the pairs of strands disposed as shown. With this arrangement the full strength of the rope is developed in the ferrule connection without the necessity for providing a safety factor to allow for damaged wires.

The greatest advantage of the present ferrule is in its use on large cables as, for example, those over one and one-half inches in diameter which require tools and fittings of excessive size when conventional connections are used. The high efficiency of the present connection allows the use of relatively smaller parts which are less expensive and easier to handle in the field as well as obviating the necessity for swaging equipment and other special tools. When the parts are assembled, self-swaging occurs by the mere use of the apparatus without any preliminary manipulations.

Having now described my invention and in what manner the same may be used, what I claim as new and desire to protect by Letters Patent is:

1. A ferrule for a rope comprising a sleeve having a conically shaped bore, and a plurality of complementary, interfitting, tapered, helical, wedging core members arranged to engage and fit said bore, helical abutting and approximately radial opposite side faces on said core members, a single interior helical groove in each core member intersecting one side face near the center of the ferrule and intersecting the opposite side face at a greater distance from the center of the ferrule, and a single helical groove in the outer surface of each core member spaced between said side faces.

2. A rope and ferrule comprising a sleeve having a conically shaped bore, a plurality of tapered, wedging core members in said bore, a single strand of said rope clamped between an outer surface of each core member and the surface of said bore, a single strand of said rope clamped between the core members of each adjacent pair, and a single strand of said rope clamped by inner portions of all of said core members and clamped between said strands which are between said core members.

3. A ferrule for a rope, comprising a sleeve having a conically shaped bore, a plurality of complementary, interfitting, tapered, helical, wedging core members arranged to fit and engage said bore, an outer bore engaging surface on each core member, approximately radial faces on opposite sides of each core member intersecting said outer surface, said face on one side of each core member being wider in a radial direction than the face on the opposite side, each wide face on one core member engaging a narrow face of an adjacent core member, a single helical groove in said outer surface of each core member spaced between said opposite side faces, and a single inner helical groove in each core member intersecting said two side faces throughout their lengths and disposed predominantly in said narrow face and confronting the wide face of an adjoining core member.

4. A rope and ferrule comprising a sleeve having a conically shaped bore therein, a plurality of helical wedging core elements in said bore, outer helical grooves in said core elements clamping certain twisted strands of the rope against said bore, inner helical grooves in said core elements fitting the remaining twisted strands in their original positions twisted about a straight center strand, inner surfaces on said core elements engaging and clamping said center strand, and surfaces in said inner grooves engaging and clamping said remaining twisted strands against said center strand.

5. A rope ferrule comprising a sleeve having a conically shaped bore, and a plurality of complementary, interfitting, tapered, helical, wedging core members having outer bore engaging surfaces arranged to engage and fit said bore, each of said core members having a single helical groove in its outer bore engaging surface for a strand of the rope and a single inner helical groove for a strand of the rope, said core members providing an axial open center space for a center strand, said center space communicating with said inner grooves so that the strands in said inner grooves are compressed against said center strand when said core members are wedged into said bore, said core members having helical abutting side faces spaced from said outer grooves, said inner grooves intersecting said side faces, and said side faces being approximately radial with one side face on each core member being wider in a radial direction than the opposite side face.

6. A ferrule for a rope having a number of strands twisted around a center strand, comprising a sleeve having a conically shaped bore therein, a plurality of helical wedging core elements arranged to fit in said bore, said core elements having outer helical grooves arranged to clamp certain twisted strands of the rope against said bore, said core elements having inner helical grooves arranged to fit the remaining twisted strands in their original positions in the rope, inner surfaces on said core elements arranged to engage and clamp said center strand, and surfaces in said inner grooves arranged to engage and clamp said remaining twisted strands against said center strand.

7. A ferrule for a rope having a single layer of strands twisted around a center strand, comprising a sleeve having a conically shaped bore therein, a plurality of helical wedging core elements arranged to fit in said bore, said core elements having outer helical grooves arranged to fit alternate ones of the twisted strands in their natural twisted positions when displaced radially from their original positions and clamp said alternate strands against said bore, said core elements having inner helical grooves arranged to fit the remaining twisted strands in their original positions in the rope, inner surfaces on said core elements arranged to engage and clamp said center strand in the spaces made vacant by said displaced strands, and surfaces in said inner grooves arranged to engage and clamp said remaining twisted strands against said center strand.

References Cited by the Examiner

UNITED STATES PATENTS

| | | | |
|---|---|---|---|
| 2,072,215 | 3/1937 | Robinson | 24—122.6 |
| 2,341,922 | 2/1944 | King et al. | 24—122.6 |
| 2,620,550 | 12/1952 | Granborg et al. | 29—517 |
| 2,901,822 | 9/1959 | Hayden | 29—517 |
| 3,045,305 | 7/1962 | Anderson | 24—122.6 |
| 3,123,879 | 3/1964 | Bouroff et al. | |

FOREIGN PATENTS

| | | |
|---|---|---|
| 165,577 | 3/1950 | Austria. |
| 185,089 | 3/1956 | Austria. |

DONLEY J. STOCKING, *Primary Examiner.*